US006389216B1

(12) United States Patent
Bartenbach et al.

(10) Patent No.: US 6,389,216 B1
(45) Date of Patent: May 14, 2002

(54) ROLLED METAL PRODUCT USED AS A LIGHT-GUIDING STRUCTURE

(75) Inventors: Christian Bartenbach, Rinn (AT); Roman Fuchs, Schaffhausen (CH); Jugo Fuhrmann, Constance; Jörg Maier, Engen, both of (DE)

(73) Assignee: Alusuisse Technology & Managment Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/155,861

(22) PCT Filed: Mar. 27, 1997

(86) PCT No.: PCT/CH97/00129

§ 371 Date: Oct. 2, 1998

§ 102(e) Date: Oct. 2, 1998

(87) PCT Pub. No.: WO97/36698

PCT Pub. Date: Oct. 9, 1997

(30) Foreign Application Priority Data

Apr. 2, 1996 (EP) .......................................... 96810204

(51) Int. Cl.[7] .............................................. G02B 6/00

(52) U.S. Cl. ...................... 385/147; 385/136; 385/900; 359/591; 359/596

(58) Field of Search ................................ 385/136, 147, 385/137, 900; 359/591, 592, 596, 597

(56) References Cited

U.S. PATENT DOCUMENTS 4,351,588 A * 9/1982 Zullig ........................ 359/596
4,498,455 A * 2/1985 Gramm ...................... 359/596
4,519,675 A * 5/1985 Bar-Yonah .................. 359/591
5,388,000 A * 2/1995 Bartenbach ................. 359/596
5,506,924 A * 4/1996 Inoue ......................... 385/147

FOREIGN PATENT DOCUMENTS

| | | |
|---|---|---|
| DE | 44 721 | 11/1887 |
| DE | 42 15 968 | 12/1993 |
| DE | 44 42 870 | 3/1996 |
| EP | 385 970 | 9/1990 |
| EP | 399 677 | 11/1990 |
| FR | 2 134 127 | 12/1972 |
| JP | 57 192 940 | 11/1982 |

* cited by examiner

*Primary Examiner*—Frank G. Font
*Assistant Examiner*—Sang H. Nguyen
(74) *Attorney, Agent, or Firm*—Cohen, Pontani, Lieberman & Pavane

(57) ABSTRACT

A light-guiding panel element arrangeable on a wall or a ceiling for lighting purposes. The light-guiding panel element including a walled metal body having at least one structured surface as a light deflecting structure with a ray of the pattern height h and a toothed-like cross-section. The tooth-like cross-section represents a period structure of rows of triangles. The triangles have bases that follow each other. A first side of each triangle runs at an angle α and a second side at an angle β from the base which is length 1. The rib structure runs in a rolling direction, α is an angle of 5 to 60°, β at an angle of 10 to 90°, a length 1 is 0.01 to 10 mm and the height h of the rib pattern is 0.1 to 2 mm. A line of contact of both sides of each triangle forms an edge with a radius $r_1$ that is less than 1/10.

22 Claims, 2 Drawing Sheets

ROLLED METAL PRODUCT USED AS A LIGHT-GUIDING STRUCTURE

BACKGROUND OF THE INVENTION

1. Field of the Invention

The present invention relates to a rolled metal product having at least one structured surface as a light-guiding structure, as well as to a process for its manufacture and its use.

2. Discussion of the Prior Art

It is known from DE-OS 42 15 968 to employ light-deflecting ceilings, e.g. metal elements with a structure, for a specific light-guiding effect. The structure of the light-deflecting ceiling may e.g. be in the form of rills and the structural magnitude should preferably be 1 to 50 mm. Producing such structures is expensive, especially as the effective, light-guiding faces of the structure should be as large a fraction of the whole as possible, and the edges between the faces should constitute as small a fraction of the whole as possible. Up to now it has not been possible to produce such structures by industrial methods, especially by efficient manufacturing processes.

DE 42 15 968 describes daylight guiding structures for the wall and ceiling region of a room which features grooves or points.

SUMMARY OF THE INVENTION

The object of the present invention is therefore to provide light-guiding structures which are light, cost favourable and can be manufactured in an industrial manner i.e. in large series production. Thereby, to produce the structured surface as a light-guiding structure, manufacturing methods are to be avoided which cause large material loss and tool wear by chip-forming methods.

This objective is achieved by way of the invention by means of rolled products of metal having at least one structured surface, which exhibits a ribbed pattern running in the rolling direction and is tooth-like in cross-section. The tooth-like cross-section represents a periodic structure in the form of rows of triangles, the bases of which follow each other. One side of the triangle runs at an angle $\alpha$, and the other side at an angle $\beta$ from the base which is of length l, $\alpha$ being an angle of 5 to 60°, $\beta$ being an angle of 10 to 90° and length l is 0.01 to 10 mm.

The bases of the triangles, which are in line, but preferably form a straight line, may however lie along a curved line.

Preferred are rolled products of the kind mentioned above, and such that at the line of contact of both sides of a triangle an edge of radius $r_1$ is formed, where $r_1$ is e.g. smaller than l/2, usefully less than l/4, preferably less than l/6, in particular preferably l/10, and in particular is 0 or at least tends towards 0 mm.

Likewise preferred are rolled products of the above mentioned kind where at the line of contact of two adjacent triangles an edge with a radius $r_2$ of 0 mm or a concave rounded line of contact with a radius $r_2$ is formed, $r_2$ being smaller than l/2, usefully less than l/3, preferably less than l/4, in particular preferably less than l/6.

Significant for the present invention is the roughness $R_a$ of the sides of the structured surface, the ribbed pattern—or at least the part of the ribbed structure which deflects the light—advantageously exhibiting a roughness $R_a$ of 0 to 1 $\mu$m, usefully less than 0.1 $\mu$m, preferably less than 0.05 $\mu$m and in particular less than 0.02 $\mu$m.

Especially preferred is a structured surface in which the angle $\alpha$ is an angle of 5 to 60° and usefully from 10 to 50°.

Especially preferred is a structured surface in which the angle $\beta$ is an angle of 10 to 90°, usefully from 15 to 90° and advantageously from 30 to 90°.

Useful is a structured surface in which the height h of the ribbed pattern is 5 mm or less, preferred is a height h of 0.1 to 2 mm.

According to the invention the structured surface of the rolled product may be part of a beam, sheet, strip or a panel or foil, whereby the beams, sheets, strips, panels or foils way be of metal, preferably aluminium or aluminium alloys, or the metals may be bright finish materials of aluminium or its alloys. In particular, aluminium or aluminium alloys having as their basis aluminium of a purity greater than 98.3 wt. % may be used.

Particularly favourable are rolled products according to the present invention the structures of which exhibit a brightened or anodised or brightened and anodised structured surface layer.

Favourable is a structured surface which exhibits as overlying layers one or more vacuum deposited layers of metals, semi-conductors (also called semi-metals), or their oxides, nitrides or fluorides or mixtures thereof.

Also favourable is a structured surface which exhibits a brightened or anodised or brightened and anodised structured surface layer and on this surface layer, as overlying layers, one or more vacuum deposited layers of metals, semi-conductors or their oxides, nitrides or fluorides or mixtures thereof.

At least one transparent scratch resistant and corrosion resistant layer may also be provided on the structured surface or on a surface layer.

Also, the structured surface may feature an under layer and one or more vacuum deposited layers of metals, semi-conductors, or their oxides, nitrides or fluorides or mixtures thereof as overlying layers.

The structured surface may also be provided with an outer layer deposited by the plasma polymerisation process.

Also, on the structured surface there may be an under layer and one or more vacuum deposited layers of metals, semi-conductors, or their oxides, nitrides or fluorides or mixtures thereof as an overlying layer and, on top of this an outer layer deposited by the plasma polymerisation process.

The under layers on the structured surface may be deposited by the plasma polymerisation process.

The surfaces of the sheets, strips or foils may be brightened electrolytically or chemically. If the surface of the sheets, strips or foils are anodised, then this may be performed using various electrolytes such as the following: acidic electrolytes viz., sulphuric acid, phosphoric acid; citric acid, tartaric acid, chromic acid electrolytes; and combinations thereof, in a direct current or alternating current process etc. Both batch anodising and continuous strip anodising are possible.

Examples of a layer or a layer system involving a plurality of layers which may be deposited in vacuum onto the structured surface or onto an already deposited surface layer (under layer) may be e.g.:

As required, at least one adhesive layer (layer A) and e.g. a ceramic layer. Such layers may e.g. contain or comprise compounds having the formula $SiO_x$, where x is a number 1 to 2, or $AlyO_z$, where y/z is a number from 0.2 to 1.5. Preferred is an adhesive layer containing $SiO_x$ where x has the meaning described above.

A light-reflecting layer (layer B), e.g. a metallic layer containing or comprising e.g. Al, Ag, Au, Cu, Cr or alloys e.g. containing at least one of the mentioned elements.

As required, a transparent protective layer (layer C) comprising or containing oxides, nitrides, fluorides, etc., of alkali metals e.g., Li, Na, K, alkali-earth metals e.g. Mg, Ca, Sr, Ba and/or transition metals such as e.g. Sc, Ti, V, Cr, Mn, Fe, Co, Ni, Y, Zr, Nb, Mo, Te, Ru, Rh, Pd, A Ta, W, Re, Os, Ir, Pt and/or Lanthanides such as e.g. La, Ce, Pr, Nd, Pm, Dy, Yb or Lu etc. Examples are layers containing or comprising PrTi-oxide and $MgF_2$ etc. Further, instead of only layer C, two or more transparent layers (layers C, D, . . . ) with different refractive indices may be provided in order to improve the degree of reflectivity due to partial light reflection at the phase boundaries of the layer C and layer D or further layers.

In the case of a plurality of dielectric and transparent layers the layer thicknesses are advantageously chosen such that the incident light experiences constructive interference at the phase boundary ($\lambda/4$ layers).

Each of the above mentioned layers deposited in vacuum is e.g. 5 to 500 nm (nanometer) thick, preferably 5 to 100 nm thick.

Useful is a layer B. Preferred is a layer system containing a layer B and a layer C or a layer system containing a layer B, a layer C and a layer D.

The layers may be deposited on the surface according to the invention or on an already deposited layer e.g. by gas or vapour phase deposition in vacuum (physical vapour deposition, PVD), by thermal vaporisation, electron beam vaporisation, with and without ion support, by sputtering, in particular magnetron sputtering, or by chemical gas phase deposition (chemical vapour deposition, CVD), with and without plasma support.

The layer or layer system may be deposited on the surface in a sequence of process steps including degreasing and cleaning the surface, charging the item bearing the surface into a vacuum unit, cleaning e.g. by sputtering, glow discharge etc., if desired in a first step deposition of the adhesive layer (layer A), in a second step deposition of at least one light-reflecting layer e.g. metallic layer (layer B), if desired in a third or second and if desired fourth or third and in further steps deposition of at least one transparent layer (layer C, if desired layer D and further layers) and removing the coated item from the vacuum unit.

Layers which may be employed as under layers or outer layers are e.g. organic coatings, PVD or CVD layers with a thickness of e.g. 0.5 $\mu$m and greater, or layers deposited by a plasma polymerisation process, or metal oxides and/or metal fluorides or metal sulphides may be employed.

Layers which may find application as transparent scratch resistant and corrosion resistant layers are e.g. organic coatings or layers deposited by a plasma polymerisation process.

The present invention relates also to a process for manufacturing a rolled product of metal with at least one structured surface, whereby a metal body such as a rolling ingot, clad plate, strips or foils are worked to a rolled product in one or, as a rule, more rolling passes between at least two rolls.

The process according to the invention is performed such that at least one roll is profiled and the profile is structured in such a manner that a ribbed pattern is formed in the rolling direction over the full length of the rolled product, said ribbed pattern being tooth-like in cross-section. The tooth-like cross-section represents a periodic structure in the form of rows of triangles, the bases of which follow each other with one side of each triangle running at an angle $\alpha$, the other side of each triangle at an angle $\beta$ from the triangle base, each of which is of length l, $\alpha$ being an angle of 5 to 60°, $\beta$ an angle of 10 to 90° and length l is 0.01 to 10 mm.

Useful is a process for manufacturing a rolled product of metal, having at least one structured surface whereby a metal body is worked to a rolled product in one or more rolling passes between at least two rolls, and thereby the structured surface is formed out of a metal body with a brightened or anodised or brightened and anodised surface, or one or more vacuum deposited layers of metals, semi-conductors, or their oxides, nitrides, sulphides or fluorides or mixtures thereof is deposited on the structured surface as overlying layers, or the structured surface is manufactured from a metal body with a brightened or anodised or brightened and anodised structured surface and on this surface layer, one or more vacuum deposited layers of metals, semi-conductors, or their oxides, nitrides, sulphides or fluorides or mixtures thereof are deposited as further overlying layers, or at least one transparent scratch resistant and corrosion resistant layer is deposited on the structured surface or on a surface layer, or an under layer is deposited on the structured surface layer and one or more vacuum deposited layers of metals, semiconductors or their oxides, nitrides, sulphides or fluorides or mixtures thereof are deposited as overlying layers, or an outer layer is deposited on the structured surface, or an under layer is deposited on the structured surface and one or more vacuum deposited layers of metals, semi-conductors or their oxides, nitrides, sulphides or fluorides or mixtures thereof are deposited as overlying layer and an outer layer deposited thereon.

The rolling operation is performed e.g. in such a manner that a blank of a given thickness is rolled to the desired thickness between a pair of rolls or several rolls or pairs of rolls, the surface of the rolled product preferably being formed in the last pass. Before the last pass pre-profiling of the re-roll strip may be carried out in such a way that the flow of material in the next pass is made more favourable or is reduced.

The roll which creates the described structure on the surface of the rolled product, exhibits the desired structure in the negative form. The structured roll may be made of generally known materials such as steel, tempered, hardened or chrome-plated steel. The negative structure may be created e.g. by chip forming processes, grinding, turning, polishing, casting, laser or electron beam or combinations thereof, by spark erosion, electrochemical or chemical methods of attack etc. The process according to the invention is preferably performed in a continuous manner with strips or rolled items. After imparting the structured surface to the rolled products, these products may be subjected to a stretching and/or straightening process and then be cut into panels, sheets or lengths of any desired length, or the rolls of material may be re-coiled or rolled up.

It is possible e.g. to produce rolled products which exhibit the ribbed pattern over their whole width. It is however also possible to produce rolled products which exhibit the ribbed pattern only over parts of their width. The ribbed pattern may e.g. be left out at the edge regions or in strips. Such variants can be produced simply by means of appropriately patterned structured rolls.

In the case of soft metal, in order to protect the fine peaks of the ribbed pattern, it is possible to protect the panels, sheets or beams with an interlying elastically or plastically deformable film. With coiled products the film is preferably provided already during coiling of the material after the last roll pass.

The products obtained may be employed as light guiding elements for technical lighting purposes e.g. in lamps, secondary lighting, daylight lighting etc. Apart from the deflection of visible light, it is possible to deflect electromagnetic radiation in the UV, IP and microwave range.

The rolled products may e.g. be cut to the desired dimensions and installed in rooms as wall panels and in particular ceiling panels. Such panels exhibit a specific light-guiding effect. Other applications relating to light entering rooms such as light falling on blinds, door frames or window frames are also possible. The panels may be arranged at any angle to the walls and ceiling according to the incidence of light and shape of the room.

The following FIGS. 1 and 2 explain the invention further by way of examples.

DETAILED DESCRIPTION OF THE PREFERRED EMBODIMENTS

Figure 1:
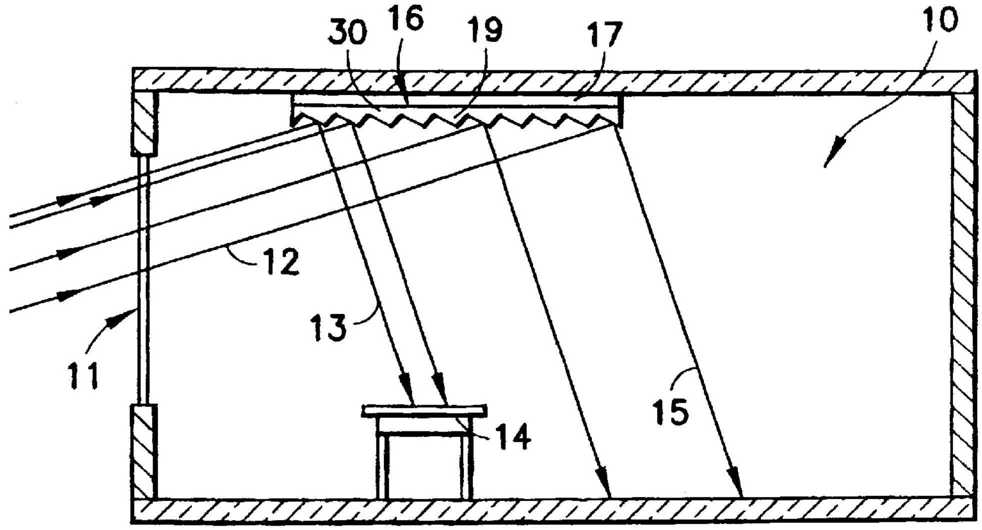
FIG. 1 shows in a simplified manner a room with incident light and the distribution of light in this room when using the light guiding structures according to the invention.

In FIG. 1 a room 10 with window area 11 is brightened by the incident light 12. The incident light 12 falls on the light-guiding element 16 according to the invention which has a rolled metal body 30 that is secured to the ceiling by a support 17. The incident light 12 is deflected by the teeth of the element 16 and the deflected light 13, 15 shines down into the room e.g. onto a workplace 14.

Figure 2:
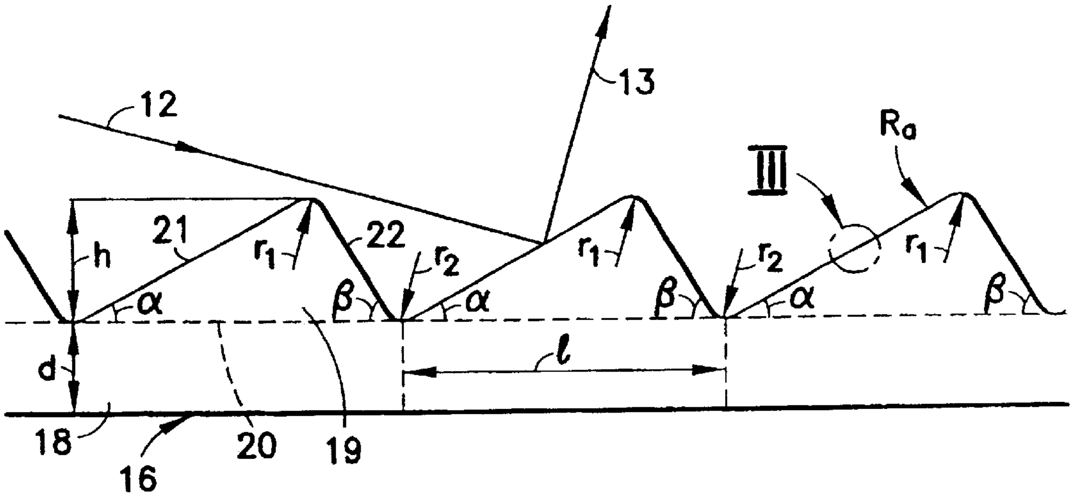
FIG. 2 shows the rolled product in cross-section, the cross-section being at right angles to the rolling directory.
Figure 3A:
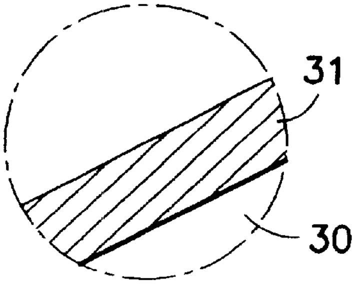
FIGS. 3*a*–3*c* are enlarged views of Section III in FIG. 2.
Figure 3B:
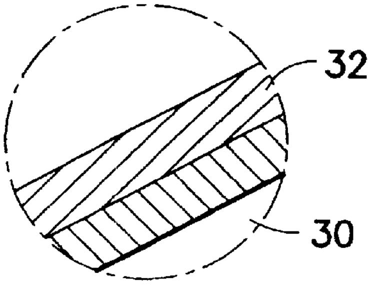
Figure 3C:
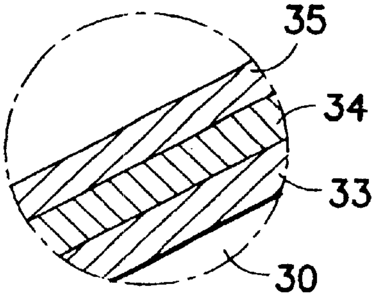

FIG. 2 shows a section out of the light-guiding element 16. A base 18 of thickness d supports a ribbed pattern with a tooth-like cross-section which comprises a row of triangles 19. The triangles 19 feature a base 20 of length l. Projecting from the base 20 at an angle α is a side 21 and at an angle β the other side 22. The height h is obtained from the dimensions l, α and β. Advantageously, the radii $r_1$ and $r_2$ tend towards 0 mm or are preferably 0 mm. The incident light 12 is deflected by the side faces 21 and falls as deflected light rays 13 e.g. from a ceiling to a workplace or a floor.

What is claimed is:

1. A light-guiding panel element arrangeable on one of a wall and ceiling for lighting purposes, comprising a rolled metal body having at least one structured surface as a light guiding structure with a rib pattern of height h and a tooth-like cross-section, the tooth-like cross-section representing a periodic structure of rows of triangles that extend completely across the metal body, the triangles having bases that follow each other, a first side of each triangle running at an angle α, and a second side at an angle β from the base which is of length l, the rib structure running in a rolling direction, α is an angle of 5 to 60°, β an angle of 10 to 90°, length l is 0.01 to 10 mm and the height h of the rib pattern is 0.1 to 2 mm, a line of contact of both sides of each triangle forming an edge with a radius $r_1$ that is less than l/10.

2. The light-guiding element according to claim 1, wherein the radius $r_1$ is substantially 0 mm.

3. The light-guiding element according to claim 1, wherein two adjacent triangles form a line of contact having an edge with a radius $r_2$ of 0 mm.

4. The light-guiding element according to claim 1, wherein two adjacent triangles form a concave line of contact having a radius $r_2$ smaller than l/2.

5. The light-guiding element according to claim 4, wherein the radius $r_2$ is less than l/3.

6. The light-guiding element according to claim 5, wherein the radius $r_2$ is less than l/4.

7. The light-guiding element according to claim 6, wherein the radius $r_2$ is less than l/6.

8. The light-guiding element according to claim 1, wherein at least parts of the pattern which are impinged with light exhibit a roughness $R_a$ of 0 to 1 μm.

9. The light-guiding element according to claim 8, wherein the parts of the rib pattern have a roughness of less than 0.1 μm.

10. The light-guiding element according to claim 9, wherein the parts of the rib pattern have a roughness of less than 0.05 μm.

11. The light-guiding element according to claim 10, wherein the parts of the rib pattern have a roughness of less than 0.02 μm.

12. The light-guiding element according to claim 1, wherein the angle α is in a range of 10 to 50°.

13. The light-guiding element according to claim 1, wherein the angle β is in a range of 20 to 90°.

14. The light-guiding element according to claim 13, wherein the angle β is in a range of 30 to 90°.

15. The light-guiding element according to claim 1, wherein the structured surface has a surface layer that is at least one of brightened and anodized.

16. The light-guiding element according to claim 1, wherein the structured surface has at least one overlying layer, the overlying layer being a vacuum deposited layer of one of metal, semi-conductor, and at least one of their oxides, nitrides and fluorides.

17. The light-guiding element according to claim 1, wherein the structured surface has a surface layer that is at least one of brightened and anodized, and at least one overlying layer on the surface layer, the overlying layer being a vacuum deposited layer of one of metal, semiconductor and at least one of their oxides, nitrides, sulphides and fluorides.

18. The light-guiding element according to claim 1, and further comprising at least one transparent, scratch resistant and corrosion resistant layer arranged on the structured surface.

19. The light-guiding element according to claim 1, wherein the structured surface includes an under layer and at least one vacuum deposited overlying layer of one of metal, semi-conductor, and at least one of their oxides, nitrides, sulphides and fluorides.

20. The light-guiding element according to claim 1, wherein an overlying layer is provided on the structured surface.

21. The light-guiding element according to claim 1, wherein the structured surface includes an under layer, at least one vacuum deposited first overlying layer made of one of metal, semi-conductors and at least one of their oxides, nitrides, sulphides and fluorides, and a second overlying layer on top of the first overlying layer.

22. The light-guiding element according to claim 1, wherein the rolled metal body is one of aluminum and aluminum alloy, the one of aluminum and aluminum alloy having a purity of at least 98.3 wt. %.

* * * * *